United States Patent
Genz

(10) Patent No.: US 7,526,378 B2
(45) Date of Patent: Apr. 28, 2009

(54) MOBILE INFORMATION SYSTEM AND DEVICE

(76) Inventor: Ryan T. Genz, 1240 N. Shore Dr., Stockholm, ME (US) 04783

(*) Notice: Subject to any disclaimer, the term of this patent is extended or adjusted under 35 U.S.C. 154(b) by 344 days.

(21) Appl. No.: 11/285,838

(22) Filed: Nov. 22, 2005

(65) Prior Publication Data
US 2006/0125786 A1 Jun. 15, 2006

Related U.S. Application Data

(60) Provisional application No. 60/630,064, filed on Nov. 22, 2004.

(51) Int. Cl.
*G01C 21/00* (2006.01)
(52) U.S. Cl. ............... 701/207; 715/727; 715/978; 701/213; 701/200; 701/209; 455/90.1; 342/450
(58) Field of Classification Search ............... 701/200, 701/209, 207, 213; 345/156; 455/90.1; 715/727, 715/978; 340/450, 985
See application file for complete search history.

(56) References Cited

U.S. PATENT DOCUMENTS

| | | | | |
|---|---|---|---|---|
| 5,771,041 A * | 6/1998 | Small | ............... | 715/727 |
| 7,068,290 B2 * | 6/2006 | Bennett et al. | ............... | 345/633 |
| 2002/0105423 A1 * | 8/2002 | Rast | ............... | 340/479 |
| 2003/0139150 A1 * | 7/2003 | Rodriguez et al. | ............... | 455/90 |
| 2004/0002843 A1 * | 1/2004 | Robarts et al. | ............... | 703/13 |
| 2004/0051718 A1 * | 3/2004 | Bennett et al. | ............... | 345/633 |
| 2004/0056779 A1 * | 3/2004 | Rast | ............... | 340/985 |
| 2004/0148099 A1 * | 7/2004 | Kim | ............... | 701/209 |
| 2005/0108261 A1 * | 5/2005 | Glassy et al. | ............... | 707/100 |
| 2005/0162402 A1 * | 7/2005 | Watanachote | ............... | 345/173 |
| 2005/0200521 A1 * | 9/2005 | Rodriguez | ............... | 342/357.12 |
| 2006/0187068 A1 * | 8/2006 | Cohen | ............... | 340/576 |
| 2006/0229114 A2 * | 10/2006 | Kim | ............... | 455/575.1 |

(Continued)

FOREIGN PATENT DOCUMENTS

EP 019742431 A1 * 4/1998

(Continued)

OTHER PUBLICATIONS

J-Sim: a simulation and emulation environment for wireless sensor networks; Sobeih, A.; Hou, J.C.; Lu-Chuan Kung; Ning Li; Honghai Zhang; Wei-Peng Chen; Hung-Ying Tyan; Hyuk Lim; Wireless Communications, IEEE [see also IEEE Personal Communications]; vol. 13, Issue 4, Aug. 2006 pp. 104-119; Digital Object Identifier 10.1109/MWC.2006.167.*

(Continued)

*Primary Examiner*—Cuong H Nguyen
(74) *Attorney, Agent, or Firm*—Schweitzer Cornman Gross & Bondell LLP

(57) ABSTRACT

The present invention includes a mobile device that is capable of storing media and optionally a wireless network connection for streaming live data between the device and the database. The data from the orientation sensor and the position sensor both go directly into the mobile device as input to a controller in the device. The controller controls in part an audio/video output that is modulated based upon the relative position of the user to an object of interest as well as the user's orientation.

6 Claims, 2 Drawing Sheets

U.S. PATENT DOCUMENTS

| | | | |
|---|---|---|---|
| 2008/0204379 A1* | 8/2008 | Perez-Noguera | 345/80 |
| 2008/0215239 A1* | 9/2008 | Lee | 701/211 |
| 2008/0235621 A1* | 9/2008 | Boillot | 715/810 |
| 2008/0246850 A1* | 10/2008 | Marlowe | 348/222.1 |
| 2008/0262714 A1* | 10/2008 | Abramovich | 701/201 |
| 2008/0262717 A1* | 10/2008 | Ettinger | 701/206 |
| 2008/0263460 A1* | 10/2008 | Altberg et al. | 715/757 |
| 2008/0284198 A1* | 11/2008 | Ryu | 296/70 |

FOREIGN PATENT DOCUMENTS

| | | | |
|---|---|---|---|
| EP | 2409593 A | * | 6/2005 |
| JP | 410141987 A | * | 5/1998 |
| JP | 411304528 A | * | 11/1999 |
| JP | 2001050771 A | * | 2/2001 |
| JP | 2003093454 A | * | 4/2003 |
| KR | 597614 B1 | * | 6/2005 |

OTHER PUBLICATIONS

Global node selection for localization in a distributed sensor network; Kaplan, L.M.; Aerospace and Electronic Systems, IEEE Transactions on; vol. 42, Issue 1, Jan. 2006 pp. 113-135; Digital Object Identifier 10.1109/TAES.2006.1603409.*

2007 Index IEEE Transactions on Geoscience and Remote Sensing vol. 45; Geoscience and Remote Sensing, IEEE Transactions on; vol. 45, Issue 12, Part 2, Dec. 2007 pp. 4195-4247; Digital Object Identifier 10.1109/TGRS.2007.912143.*

Robust and High Data Rate Wireless Link for Security Between a Bus and a Control Centre; Moniak, G.; Masson, E.; Dumortier, H.; Berbineau, M.; Rivenq, A.; Vehicular Technology Conference, 2007. VTC-2007 Fall. 2007 IEEE 66th; Sep. 30, 2007-Oct. 3, 2007 pp. 1426-1430; Digital Object Identifier 10.1109/VETECF.2007.304.*

Ultrasonic relative positioning for multi-robot systems; Rivard, F.; Bisson, J.; Michaud, F.; Letourneau, D.; Robotics and Automation, 2008. ICRA 2008. IEEE International Conference on; May 19-23, 2008 pp. 323-328; Digital Object Identifier 10.1109/Robot.2008.4543228.*

Adaptive Dynamic Reaction to Automotive IT Security Incidents Using Multimedia Car Environment; Hoppe, T.; Kiltz, S.; Dittmann, J.; Information Assurance and Security, 2008. ISIAS '08. Fourth International Conference on; Sep. 8-10, 2008; pp. 295-298; Digital Object Identifier 10.1109/IAS.2008.45.*

Relative position of UGVs in constrained environments using low cost IMU and GPS augmented with ultrasonic sensors; Henderson, H.P.; Bevly, D.M.; Position, Location and Navigation Symposium, 2008 IEEE/ION; May 5-8, 2008 pp. 1269-1277; Digital Object Identifier 10.1109/Plans.2008.4570080.*

Automatic Lifelog media annotation based on heterogeneous sensor fusion; Kim, Ig-Jae; Ahn, Sang Chul; Ko, Heedong; Kim, Hyoung-Gon; Multisensor Fusion and Integration for Intelligent Systems, 2008. MFI 2008. IEEE International Conference on Aug. 20-22, 2008 pp. 703-708; Digital Object Identifier 10.1109/MFI.2008.4648028.*

A collaborative sensor grids framework; Fox, G.; Ho, A.; Rui Wang; Chu, E.; Isaac Kwan; Collaborative Technologies and Systems, 2008. CTS 2008. International Symposium on; May 19-23, 2008 pp. 29-38; Digital Object Identifier 10.1109/CTS.2008.4543909.*

Development of a collaborative multimodal system with a shared sound display; Takeshi Nakaie; Koyama, T.; Hirakawa, M.; Ubi-Media Computing, 2008 First IEEE International Conference on; Jul. 31, 2008-Aug. 1, 2008 pp. 14-19; Digital Object Identifier 10.1109/Umedia.2008.4570859.*

Constellation Challenges and Contributions of Taiwan Weather Monitoring Satellites; Chen-Joe Fong; Yen, N.; Chu, V.; Yang, E.; Cheng-Yung Huang; Shao-Shing Chen; Yuei-An Liou; Chi, S.; Aerospace Conference, 2008 IEEE; Mar. 1-8, 2008 pp. 1-11; Digital Object Identifier 10.1109/Aero.2008.4526663.*

Sensor Localization Using Acoustic Transient Signal Sources with Known Positions; Lo, K.W.; Ferguson, B.G.; Intelligent Sensors, Sensor Networks and Information, 2007. ISSNIP 2007. 3rd International Conference on; Dec. 3-6, 2007 pp. 197-202; Digital Object Identifier 10.1109/ISSNIP.2007.4496843.*

* cited by examiner

MOBILE INFORMATION SYSTEM AND DEVICE

RELATED APPLICATION

This application claims the benefit of U.S. Provisional Patent Application Ser. No. 60/630,064 filed Nov. 22, 2004, which is incorporated herein by reference in its entirety.

BACKGROUND OF THE PRESENT INVENTION

1. Field of the Invention

The present invention relates generally to the art of providing environmental information. More particularly, the present invention relates to the field of mobile information systems that can electronically provide environmental information to a user.

2. History of the Prior Art

Location based content is quickly becoming a reality as many people are using mobile electronic devices as a means of gathering information while moving through places in the world, often places with which they may be unfamiliar. Like other forms of data or media content, users of location based systems will also find that in certain situations they will also enjoy to have richer more immersive experiences of the place or the content. Location based media will become much more exciting and interesting as new techniques are developed for making the media richer, interactive and immersive.

There is a need in the art for an improved system for creating augmented reality environments or environments enriched with location-based content. There is a further need in the art for a system for navigating such environments through the combination of the user's location, the direction that the user is looking and any other user input by which a correlation may be made between the view the user is seeing and data associated with that view. Such a system would most preferably communicate both visual and aural data to the user, although in some embodiments it is not necessary to communicate both forms of data, and either aural or visual data may be sufficient depending upon the implementation.

SUMMARY OF THE PRESENT INVENTION

The system and device of the present invention includes at least one orientation sensor and a location sensor that are operatively coupled to a mobile device. The mobile device is operatively connected to a database which, in at least a first embodiment, contains information relating to an object or area of interest to the user. For example, the database may include information concerning geographic, historical and other information concerning a location being visited by the user. The orientation sensor may be a digital compass, magnetometer, gyro, or other device capable of distinguishing a reference direction from a standard direction, such as magnetic north. The position sensor can be any object tracking system or technique that can determine a position with reference to longitude, latitude and, in some embodiments, elevation, and may for example be a global positioning system (GPS), or a system for radio frequency triangulation such as that used for determining the position of a mobile telephone, or any other suitable object tracking technique.

The system includes a mobile device that is capable of outputting media and, in at least some embodiments, is capable of storing media. In some embodiments, the mobile device includes a wireless network connection for streaming live data between the device and the database, although in some devices the database may be incorporated in whole or in part in the mobile device. The mobile device includes a controller for dynamically selecting data appropriate to the user's orientation, and outputting that data in an appropriate form for utilization by the user. Position and orientation information from the orientation sensor and the position sensor both go directly into the mobile device as inputs to the controller. The communication between sensors and device can take any suitable form which allows the controller to provide to the user appropriate data for an enriched appreciation of the location or object being viewed by the user. The connection between the mobile device and the remainder of the system, or between any other system component and the rest of the system, can be wired or wireless; and the data can be transmitted through any protocol available on wired or wireless networks.

The system further comprises an audio output that is connected to the controller for providing an audio signal to a user, for example through a pair of headphones. In at least some embodiments, the headphones provide a platform for and are connected to the orientation sensor and the position sensor so that these sensors can accurately detect user position and provide that information to the controller for determining the orientation of the user's head and, thus, the user's eyes and ears. While only one orientation is used in some embodiments, a plurality of sensors can be used to detect pitch and yaw data as well as rotational data, and thus provide a richer experience to the user. The controller is then adapted to adjust the audio output to the user based upon the direction in which the user is oriented. As such, the user is treated to a directional theatre experience that can provide video or audio data, or both, from the database in a unique and innovative virtual soundscape. Further details and embodiments of the present invention are described in detail below with reference to the following drawings.

DETAILED DESCRIPTION OF THE PREFERRED EMBODIMENTS

Figure 1:
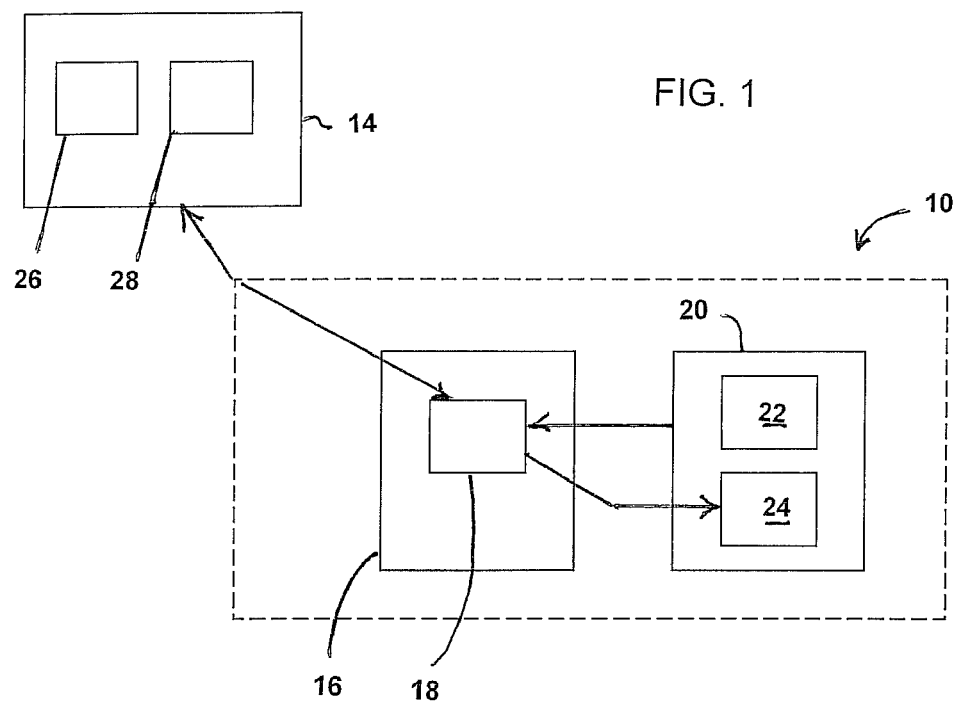
FIG. 1 is a schematic view of a first implementation of the system and device of the present invention.
Figure 2:
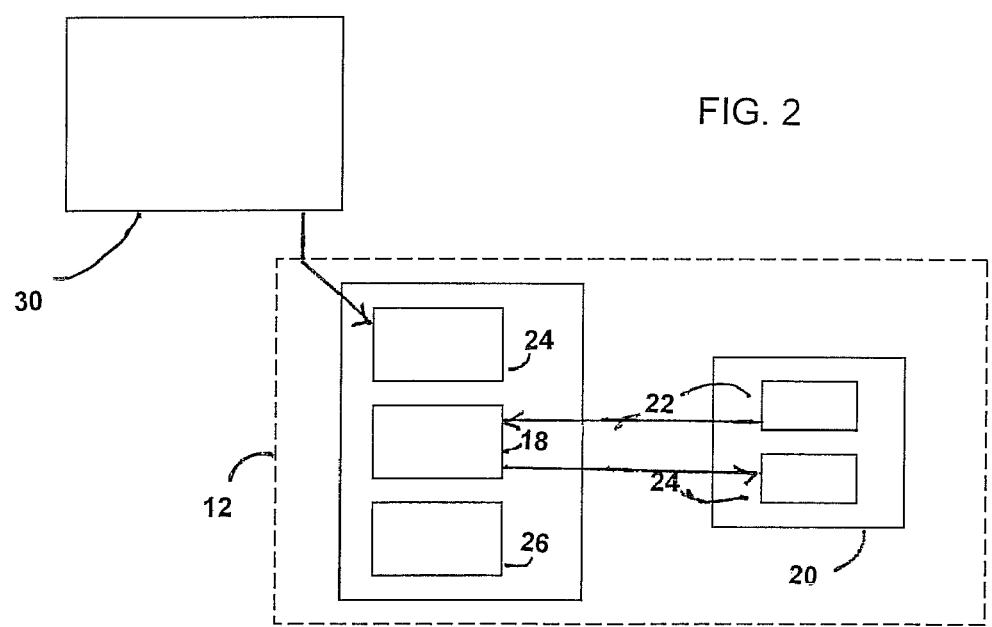
FIG. 2 is a schematic view of an alternative embodiment of the system and device of the present invention.

Referring now to FIGS. 1 and 2, the preferred embodiments of the present invention are now described in detail. Shown in FIG. 1, the system 10 of the present invention includes a client device 12 including a mobile device 16 and an audio output 20. The mobile device 16 includes a controller 18 for receiving, processing and outputting data, and the audio output 20, which may be connected to the mobile device 16 by any suitable wired or wireless connection, includes one or more orientation sensors 22 and at least a pair of speakers 24, which may, for example, be headphones of the type known in the art. In at least some embodiments, it is desirable to use a plurality of orientation sensors to determine not only the rotational position of the user's head, but also pitch and yaw information.

The system 10 also includes a database 14 and associated logic as needed to determine a user's position 26, such as a position sensor or triangulation software based upon the wireless connection between the database 14 and the mobile device 16, or a look-up table or other technique for using data received from the device itself to determine location. The database 14 also includes means for providing streaming media 28 across the wireless connection to the mobile device 16.

In a second embodiment, shown in FIG. 2, the database 26 is directly coupled to the mobile device 16, as is the position sensor 24. In this embodiment, the position sensor 24 may be a global positioning sensor (GPS) that is in communication with a global positioning satellite or satellite network 30. The mobile device 16 is coupled to the output 20, which may comprise either a video display or an audio output, or both depending upon the implementation. The output 20 typically includes the orientation sensor 22 and the speakers 24, which again may be of the headphone variety in at least some audio embodiments, although other implementations may be implemented to provide a customized listening space, such as transducers integrated into clothing or otherwise wearable, chairs having speakers therein, or even a viewing or listening room. For those embodiments which include a video output, a display may be included in glasses worn by the user, or a head-up display may be implemented, or any other suitable video output which permits the user the desired mobility.

The mobile device 16 further includes a controller 18 for processing data from the position sensor 24 and the orientation sensor 22, retrieving data from the database 26, and providing an output signal to the speakers 24 according to predetermined spatial relationships. The controller 18 is adapted to operate as a standalone application program, or can be a file or combination of files that a "player" software reads and plays for the user so that the mobile device 16 device and controller 18 can be used to play any content which has been authored for the system 10 by any number of software vendors.

In operation, the data taken from the orientation sensor 22 in combination with the data from the location sensor 24 can be used to navigate virtual location-based content that can be explored by, for example, walking in the real (physical) world. The system 10 can use this data, for example, to create a three-dimensional sound space or directional theatre that is able to map a landscape of sound onto the real world, where the sound may be artificial or a reproduction of sounds naturally associated with the area.

For the creation of a 3-dimensional "soundscape", or audio-landscape of 3-D positioned sounds, the data required is the user's location and orientation, and the location of the sound in the "virtual" space. The mobile device 16 takes the input from the orientation sensor 22 and applies this data to a formula that manipulates the audio outputs that it is sending to the speakers 24.

The directional theatre is created by manipulating the relative amplitude of the left and right speaker sounds based upon any suitable algorithm. For example, the relationship between the virtual source of the sound and the first direction in which the user is oriented may be represented by a simple trigonometric. Thus, if the original normalized volume of a sound is A and the angle of the sound relative to the user is θ, then:

$$A_r = -\sin(\theta) + d, \text{ and} \quad (1)$$

$$A_l = \cos(\theta + (\pi/2)) + d, \quad (2)$$

Figure 3:
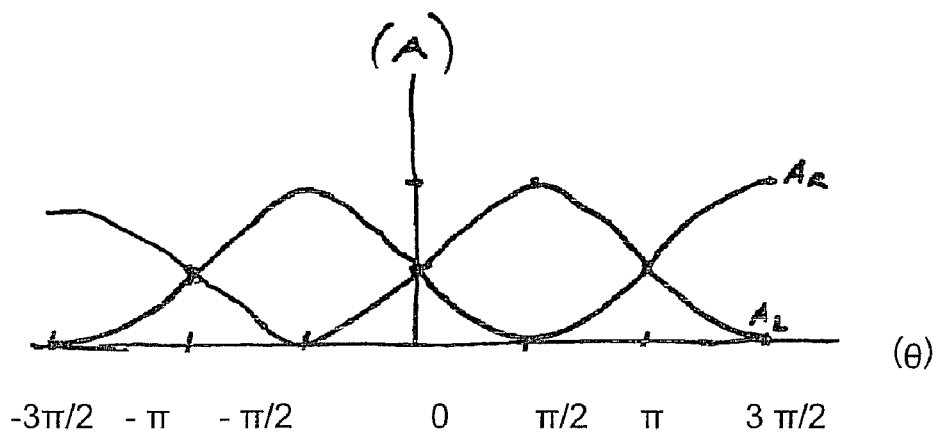
FIG. 3 is a graphical representation of the directional theatre feature of the present invention.

Equations 1 and 2 are graphically shown in FIG. 3. It will be appreciated that many other algorithms exist for manipulating the relative amplitudes of the audio output, and the present invention is not limited to a particular method.

Figure 4:
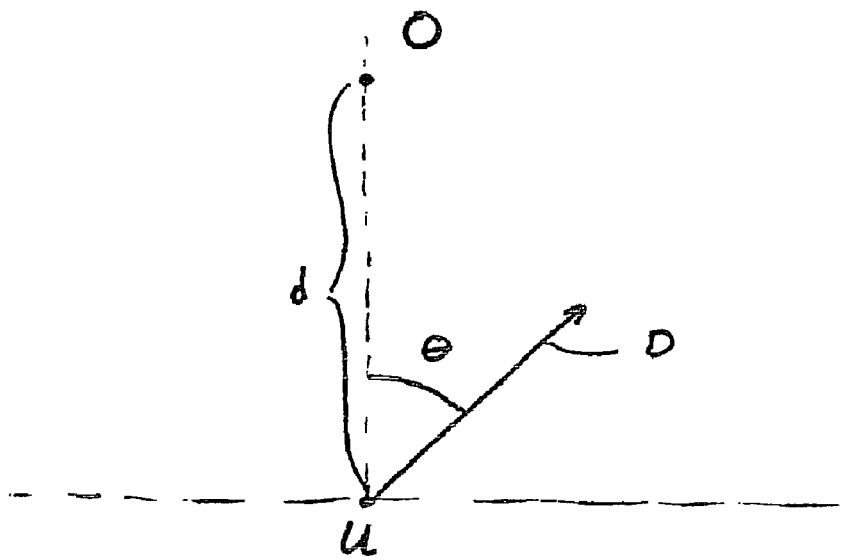
FIG. 4 is a schematic view of the operation of the system of the present invention as it relates to the orientation sensor and the directional theatre feature.

Referring now to FIG. 4, and using the trigonometric relationship discussed above simply for purposes of clarity of illustration, the interface between the system 10 of the present invention and the directional theatre is shown schematically. A user U is shown at a distance d from an object O from which the virtual sounds are deemed to emit. Data from the position sensor 22 determines the distance d, which affects the absolute amplitude of the sounds emitted by the speakers 24. The orientation sensor 22 determines the direction D in which the user U is facing, and the controller 18 can thus determine the angle θ.

As previously noted, the relative volume emitted by the object will, for the example given herein, depend upon the trigonometric relationships between the user and the object. For an angle of zero, we would expect relative amplitude of the volume in the right and left speakers to be equal, as shown in FIG. 3. As the user turns to his right, say at a 45 degree angle, then we would expect the relative amplitude of the volume to increase in the left ear and decrease in the right ear. If the user completes a turn to a full 90 degrees, then we would expect that there would be no volume in the right ear and the full amplitude of volume in the left ear, as shown in FIG. 3. Of course, those skilled in the art will appreciate that the dispersion of sound may vary with more than just a trigonometric relationship, and thus it may be desirable to implement more complex algorithms to improve the "naturalness" of the audio output 20, or to apply a first algorithm to one kind of sound (for example, a foreground sound) but another algorithm to a different type of sound (e.g., a background sound). In addition, although the present example discusses an audio output in detail, it will be appreciated that substantially these same considerations apply to a video output, and that the description of an audio output is used for exemplary purposes only and is not intended to be limiting.

In order to create the directional theatre, the system 10 of the present invention compiles the location of the person in the real world as they are moving, the direction that person is facing, and the 'virtual' location of the sound. The first variable is derived from the position sensor 24. The second variable is derived from the orientation sensor 22. The virtual location of the sound is predetermined and established within the database 14, which can be internal or external to the mobile device 16. Lastly, the system 10 preferably will permit the system to independently control the volume of the sounds going to the speakers 24 of the headphones that the person is wearing or other listening environment.

It should be apparent to those skilled in the art that the foregoing discussion is merely an illustration of the preferred embodiments of the present invention, and that many other useful and equivalent modifications and substitutions may be made without deviating from the scope and purpose of the present invention as set forth in the following claims.

I claim:

1. A device for providing environmental information to a user, the device comprising: a positioning sensor for determining a position of the user; an orientation sensor for determining an orientation of the user; a mobile device in communication with the positioning sensor and the orientation sensor, the mobile device having a controller adapted for processing data from the positioning sensor and the orientation sensor and identifying an environment associated with the data; and an audio device coupled to the controller, the audio device adapted to provide a continuous three dimensional soundscape audio output associated with the environment in response to continuing data provided by the orientation sensor and positioning sensor to the controller and associated with the environment thereby defined.

2. A system for providing environmental information to a user, the system comprising; a database containing environmental information; a positioning sensor for determining a position; an orientation sensor for determining an orientation; a mobile device in communication with the database, the mobile device further in communication with the positioning sensor and the orientation sensor, the mobile device having a controller adapted for processing location data from the positioning sensor and the orientation sensor and associating a continuing series of subsets of the environmental information with changing location data; and an audio device coupled to the mobile device and the controller, the audio device adapted to provide a continuous three dimensional soundscape audio output associated with the environmental information subsets in response to the location data.

3. The device of claim 1, wherein the environment includes data corresponding to physical features and orientation of the physical features with respect to the user.

4. The device of claim 3, wherein the orientation data includes distance and bearing from the user data.

5. The system of claim 2, wherein the environmental information includes information corresponding to physical features and orientation of the physical features with respect to the user.

6. The device of claim 5, wherein the orientation information includes distance and bearing from the user data.

* * * * *